(12) United States Patent
Shelbourn et al.

(10) Patent No.: US 7,631,591 B2
(45) Date of Patent: Dec. 15, 2009

(54) TWO STAGE SPOOL CENTERING MECHANISM

(75) Inventors: William C. Shelbourn, Bismarck, ND (US); Kyle D. Kaldor, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 233 days.

(21) Appl. No.: 11/561,961

(22) Filed: Nov. 21, 2006

(65) Prior Publication Data

US 2008/0116403 A1 May 22, 2008

(51) Int. Cl.
*F15B 11/08* (2006.01)
(52) U.S. Cl. .......................................... 91/436; 137/529
(58) Field of Classification Search ................... 91/436; 137/529; 251/337
See application file for complete search history.

(56) References Cited

U.S. PATENT DOCUMENTS

| | | | |
|---|---|---|---|
| 3,243,025 A | 3/1966 | Staab et al. | |
| 3,386,471 A | 6/1968 | King | |
| 3,473,566 A | 10/1969 | Peppel | |
| 3,895,703 A | 7/1975 | Schmitt et al. | |
| 3,935,792 A | 2/1976 | Dezelan et al. | |
| 3,990,352 A | 11/1976 | Nishida et al. | |
| 4,013,381 A | 3/1977 | Hein et al. | |
| 4,479,514 A * | 10/1984 | Bennett | ........................ 91/464 |
| 5,115,722 A | 5/1992 | Ichihashi et al. | |

* cited by examiner

*Primary Examiner*—F. Daniel Lopez
(74) *Attorney, Agent, or Firm*—John D. Veldhuis-Kroeze; Westman, Champlin & Kelly, P.A.

(57) ABSTRACT

A valve arrangement includes a spool movable in first and second strokes. A first biasing member has a first spring constant and a first preload, and a second biasing member has a second spring constant lower than the first spring constant and a second preload higher than the first preload. The first biasing member and not the second biasing member biases the spool toward the center position through the entire first stroke and is deflected during movement of the spool from a center position to an intermediate position within the second stroke. The first and second biasing members are deflected during movement of the spool from the intermediate position to an end of the second stroke.

23 Claims, 11 Drawing Sheets

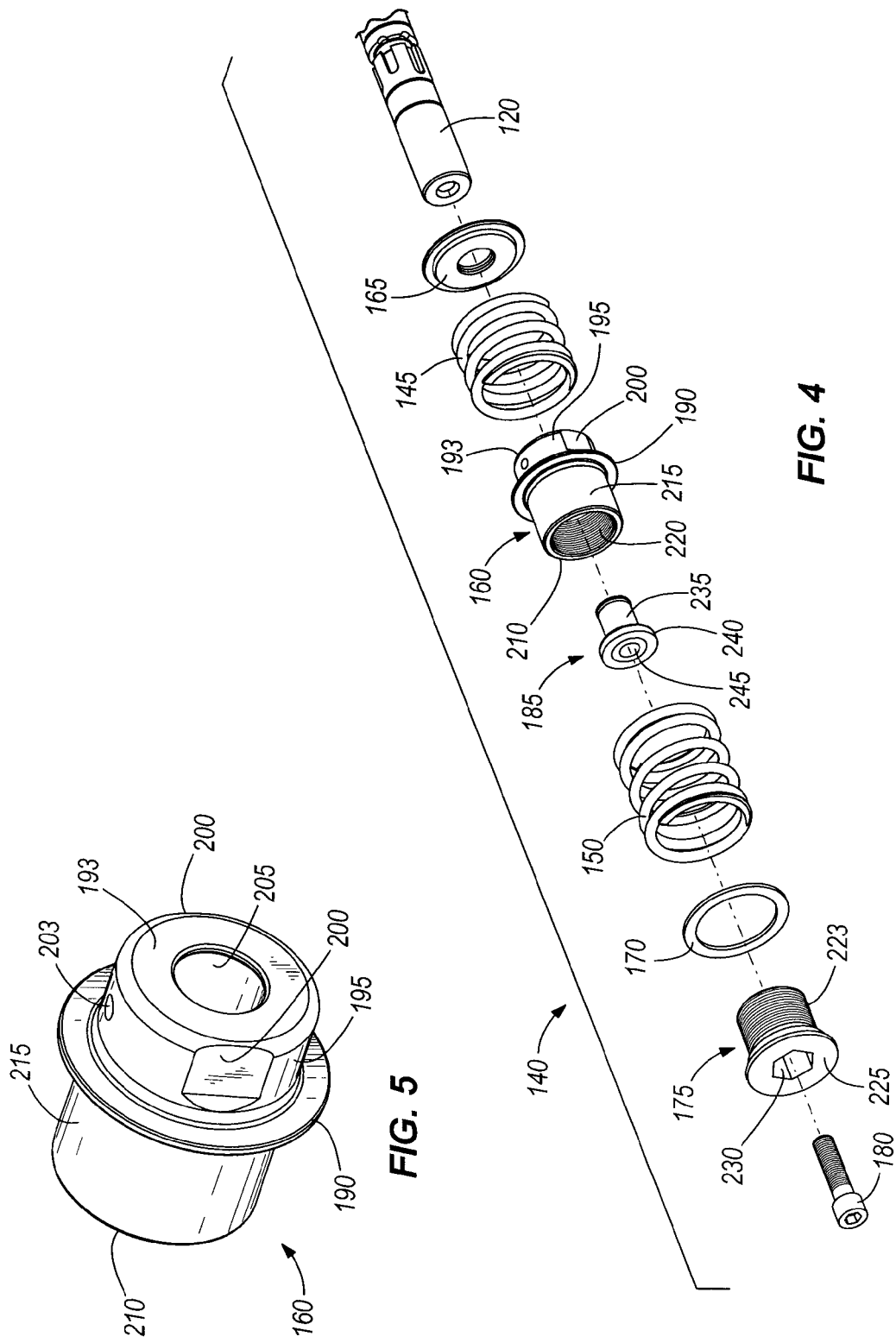

TWO STAGE SPOOL CENTERING MECHANISM

BACKGROUND

The present invention relates to a two stage spool centering mechanism.

SUMMARY

The invention provides a valve arrangement comprising: a spool movable from a center position in a first direction through a first stroke and in a second direction through a second stroke; a first biasing member having a first spring constant and a first preload; and a second biasing member having a second spring constant lower than the first spring constant and a second preload higher than the first preload. The first biasing member and not the second biasing member biases the spool toward the center position through the entire first stroke. The first biasing member and not the second is deflected during movement of the spool from the center position to an intermediate position within the second stroke. The first and second biasing members are deflected during movement of the spool from the intermediate position to an end of the second stroke, the biasing force of the first and second biasing members acting in series being less than the first spring constant and less than the second spring constant.

The invention may be used, for example, in a skid steer loader. The first stroke may correspond to a raising stroke of a lift spool in the main control valve of the loader, and the second stroke may correspond to a lowering stroke. During the raising stroke and first portion of the lowering stroke, the lift spool is resisted by the relatively high first spring constant and may enable a metering mode of operation that facilitates relatively precise control of the lift arm. When the spool moves into the second portion of the lowering stroke, the lift arm and bucket of the skid steer loader are acted upon only by the forces of gravity. The spool is resisted by the relatively low spring constant of the first and second biasing members acting in series when the spool is in the second portion of the lowering stroke. The relatively low spring constant permits the lift spool to be moved into and held within the second portion of the lowering stroke with minimal use of hydraulic pressure and vehicle power so that available hydraulic pressure and vehicle power may be used for other purposes.

Other aspects of the invention will become apparent by consideration of the detailed description and accompanying drawings.

BRIEF DESCRIPTION OF THE DRAWINGS

FIG. 4 is an exploded view of a first embodiment of a two-stage valve assembly.

FIG. 5 is a perspective view of an intermediate member of the two-stage valve assembly.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
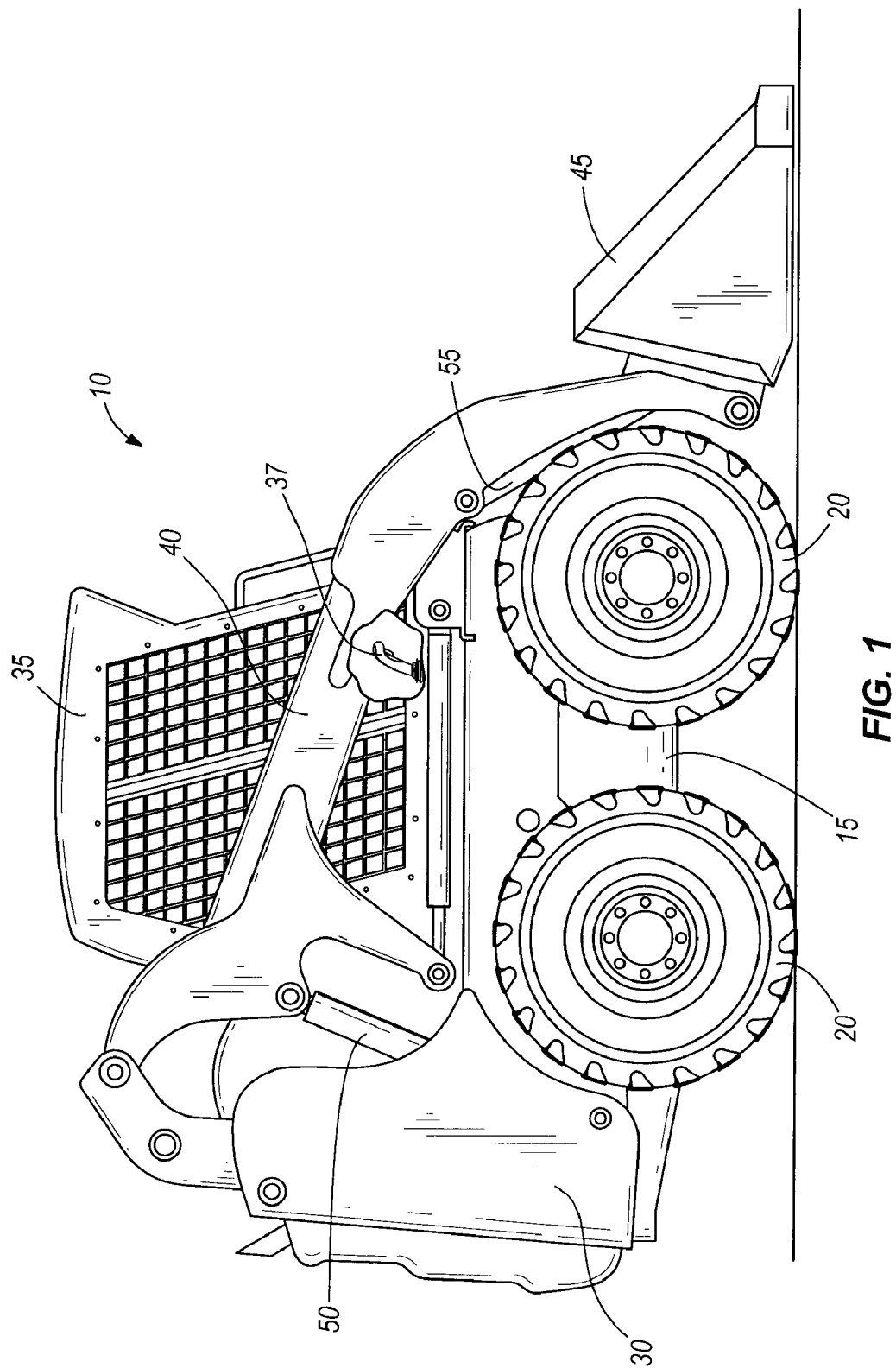
FIG. 1 is a side view of a skid steer loader according to one embodiment of the present invention.
Figure 2:
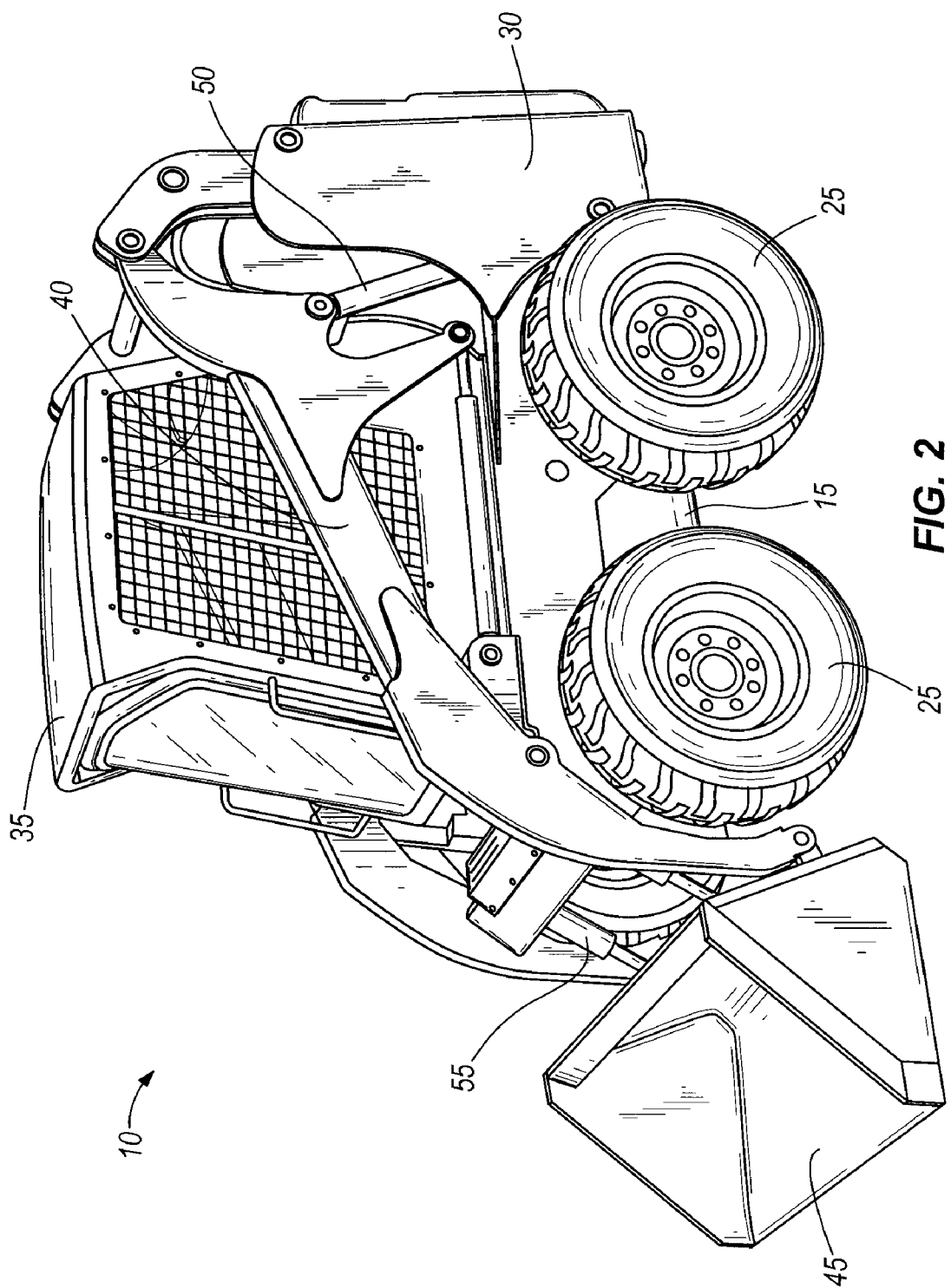
FIG. 2 is a perspective view of the skid steer loader.

FIGS. 1 and 2 depict a skid steer loader 10 having a frame 15 supported by two right side wheels 20 and two left side wheels 25, an internal combustion engine 30, an operator compartment 35 that contains an operator control 37, right and left lift arms 40, and a bucket 45 mounted for tilting between the distal ends of the lift arms 40. Although the invention is illustrated embodied in a skid steer loader 10, the invention may be embodied in other vehicles and machines. Although the illustrated operator control 37 takes the form of a joystick, in other embodiments, the control may include multiple joysticks and/or foot pedals.

The right side wheels 20 are driven independently of the left side wheels 25. When all four wheels 20, 25 turn at the same speed, the loader 10 moves forward and backward, depending on the direction of rotation of the wheels 20, 25. The loader 10 turns by rotating the right and left side wheels 20, 25 in the same direction but at different rates, and rotates about a substantially zero turn radius by rotating the right and left side wheels 20, 25 in opposite directions.

The lift arms 40 raise (i.e., rotate counterclockwise in FIG. 1) and lower (i.e., rotate clockwise in FIG. 1) with respect to the frame 15 under the influence of lift cylinders 50 mounted between the frame 15 and the lift arms 40. The bucket 45 tilts with respect to the arms 40 to curl (i.e., rotate counterclockwise in FIG. 1) and dump (i.e., rotate clockwise in FIG. 1) under the influence of tilt cylinders 55 mounted between the lift arms 40 and the bucket 45. Various auxiliary implements or devices may be substituted for or used in conjunction with the bucket 45. An example, but by no means exhaustive, list of auxiliary implements includes augers, jack hammers, trenchers, grapples, rotary sweepers, stump grinders, saws, concrete mixers, pumps, chippers, snow throwers, rotary cutters, and backhoes.

Figure 3:
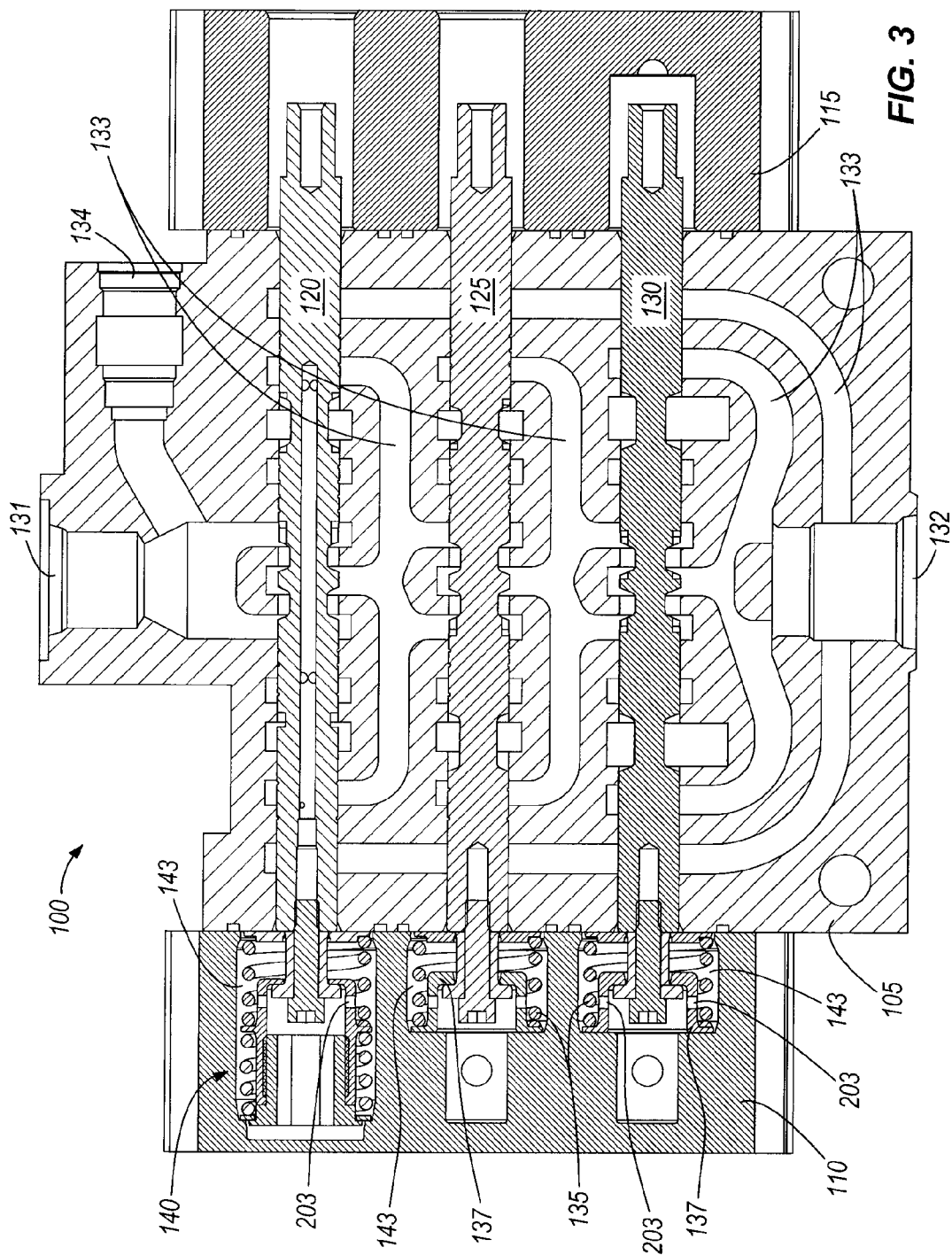
FIG. 3 is a cross sectional view of the main control valve of the skid steer loader.

FIG. 3 illustrates a portion of a main control valve ("MCV") 100 of the skid steer loader 10. The MCV 100 includes a spool housing 105, a spring housing 110, an actuator housing 115, a lift spool 120, a tilt spool 125, and an auxiliary spool 130. The spool housing 105 includes an inlet 131, an outlet 132, and a plurality of conduits 133. A pressure relief conduit 134 permits hydraulic fluid to bleed away from the MCV 100 if pressure exceeds a selected threshold.

The lift, tilt, and auxiliary spools 120, 125, 130 are illustrated in FIG. 3 in center or neutral positions. When in the neutral positions, the lift and tilt spools do not permit the lift and tilt cylinders 50, 55 to extend or retract, and therefore maintain the lift arms 40 and bucket 45 in fixed positions. The lift, tilt, and auxiliary spools are shifted under the influence of the operator control 37 off center to allow hydraulic fluid to flow through the conduits 133 to the respective lift cylinders 50, tilt cylinders 55, and auxiliary implement. The tilt and auxiliary spools 125, 130 are centered within the MCV 100 with springs 135 that bear against caps 137, and the lift spool 120 is centered with a two-stage spring assembly 140. The springs 135, caps 137, and the two-stage spring assembly 140 are in cavities 143 in the spring housing 110. Hydraulic actuators within the spring housing 110 and/or the actuator housing 115 engage the ends of the lift, tilt, and auxiliary spools 120, 125, 130 and shift them left and right.

With reference to FIG. 4, the two-stage spring assembly 140 includes first and second springs 145, 150, an intermediate member 160, inner and outer end washers 165, 170, a threaded cap 175, a fastener 180, and a spacer 185. The first and second springs 145, 150 are arranged in series relation to each other, and have different spring constants, with the spring constant of the first spring 145 being higher than that of the second spring 150.

With additional reference to FIG. 5, the intermediate member 160 includes a flange 190. Between the flange 190 and a first end 193 of the intermediate member 160 is a first cylindrical portion 195 having diametrically-opposed flats 200 on its outer surface and diametrically-opposed holes 203 (also seen in FIGS. 3 and 6-8) communicating through the intermediate member wall. The holes 203 provide a flow path that permits oil to freely flow into and out of the intermediate member to accommodate oil displaced by movement of the intermediate member 160 in its cavity 143. The caps 137 (FIG. 3) on the centering springs 135 of the tilt and auxiliary spools 125, 130 also include oil bypass holes 203 to facilitate movement of the caps 137 in their cavities 143. The first end 193 of the intermediate member 160 is closed except for a hole 205. Between the flange 190 and a second end 210 of the intermediate member 160 is a second cylindrical portion 215 having a smooth outer surface and female threads 220 (FIG. 4).

Referring again to FIG. 4, the threaded cap 175 includes male threads 223 and a flared end 225 with a socket-shaped hole 230 in it. The spacer 185 includes an elongated portion 235, a lip 240, and a longitudinal bore 245.

The two-stage spring assembly 140 is assembled by first positioning the spacer 185 within the intermediate member 160 such that the elongated portion 235 of the spacer 185 extends out of the hole 205 in the first end 193 of the intermediate member 160. The lip 240 of the spacer 185 is larger than the hole 205, so the spacer 185 cannot pass entirely through the hole 205.

Then, with the second spring 150 and outside washer 170 positioned around the second cylindrical portion 215 of the intermediate member 160 and around the male threads 223 of the threaded cap 175, the male threads 223 of the threaded cap 175 thread into the female threads 220 of the second cylindrical portion 215 of the intermediate member 160 until the flared end 225 of the threaded cap 175 abuts against the second end 210 of the intermediate member 160.

Tightening the cap 175 into the second cylindrical portion 215 may be facilitated by inserting a hex wrench, such as an Allen wrench, into the socket-shaped hole 230, and by fitting a wrench against the flats 200 on the first cylinder portion 195 of the intermediate member 160. Relative rotation of the wrenches will result in tightening or loosening of the cap 175 in the intermediate member 160.

The second spring 150 and outer washer 170 are trapped between the flange 190 of the intermediate member 160 and the flared end 225 of the threaded cap 175. The length of the second cylindrical portion 215 is shorter than the at-rest length of the second spring 150. As the threaded cap 175 is threaded into the second cylindrical portion 215, the distance between the flared end 225 and the flange 190 decreases. The space between the outer washer 170 and flange 190 corresponds to a desired compressive preload on the second spring 150 when the threaded cap 175 is snugly threaded into the second cylindrical portion 215.

Next, with the first spring 145 surrounding the first cylindrical portion 195 of the intermediate member 160 and the inner washer 165 held against the end of the lift spool 120, the fastener 180 is inserted through the socket-shaped hole 230 in the threaded cap 175, extended through the longitudinal bore 245 in the spacer 185, and threaded into the end of the lift spool 120. The socket-shaped hole 230 provides access for a tool, such as an Allen wrench, to engage and tighten the fastener 180 into the end of the lift spool 120. As the fastener 180 is threaded into the end of the lift spool 120, the lip 240 of the spacer 185 bears against the inner surface of the first end 193 of the intermediate member 160 and draws it closer to the lift spool 120. The space between the flange 190 and the inner washer 165 therefore decreases, which results in a compressive preload on the first spring 145. The fastener 180 is advanced into the end of the lift spool 120 until the spacer 185 is tightly sandwiched between the fastener 180 and the end of the lift spool 120. The length of the spacer 185 corresponds to a desired deflection or preload on the first spring 145. Once assembled, the first and second springs 145, 150 are arranged end-to-end with the flange 190 between them.

With reference to FIG. 3, when the spool is in the center position, the inner washer 165 abuts against the spool housing portion 105 of the MCV 100 and the outer washer 170 abuts against a step 250 (seen best in FIGS. 6-8) of the spring housing portion 110 of the MCV 100. When the lift spool 120 is shifted right (as viewed in FIG. 3), hydraulic fluid is permitted to flow to a "raise" side of the lift cylinders 50, which extends the lift cylinders 50 and causes the lift arms 40 to raise. When the lift spool 120 is shifted to the left (as viewed in FIG. 3), hydraulic fluid is permitted to flow to a "lower" side of the lift cylinders 50, which retracts the lift cylinders 50 and causes the lift arms 40 to lower. The total displacements of the lift spool 120 from the center position to the right and left are referred to as the "raising stroke" and "lowering stroke," respectively.

Figure 6:
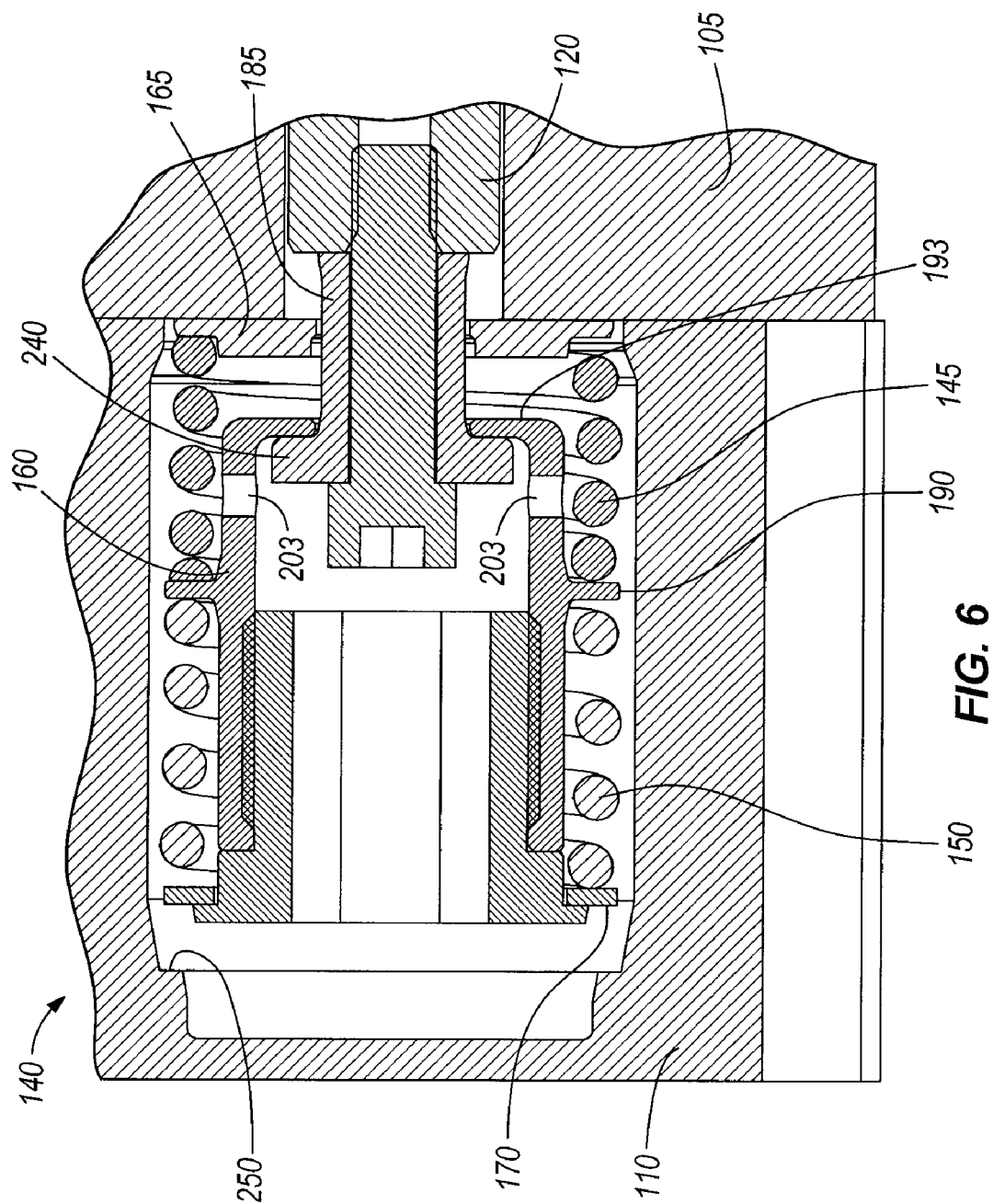
FIG. 6 is a cross-sectional view of the two-stage valve arrangement of FIG. 4 during a raising stroke.

With reference to FIG. 6, when the lift spool 120 is shifted right, the lip 240 of the spacer 185 abuts against the inner side of the first end 193 of the intermediate member 160 and pulls the intermediate member 160 to the right. The intermediate member 160 acts as a force transferring member as it transfers the force of rightward movement of the spool 120 and spacer 185 into compression of the first spring 145 through the flange 190. The distance between the flange 190 and the inner washer 165 becomes smaller and the first spring 145 deflects (i.e., is compressed). The outer washer 170 is lifted from the step 250 in the spring housing 110, but the space between the outer washer 170 and the flange 190 remains constant (i.e., no deflection of the second spring 150 beyond its preloaded state). In this regard, the intermediate member 160 insulates the second spring 150 from exposure to any forces in the first spring 145, and the lift spool 120 is resisted only by the spring constant of the first spring 145 during the entire raising stroke.

Figure 7:
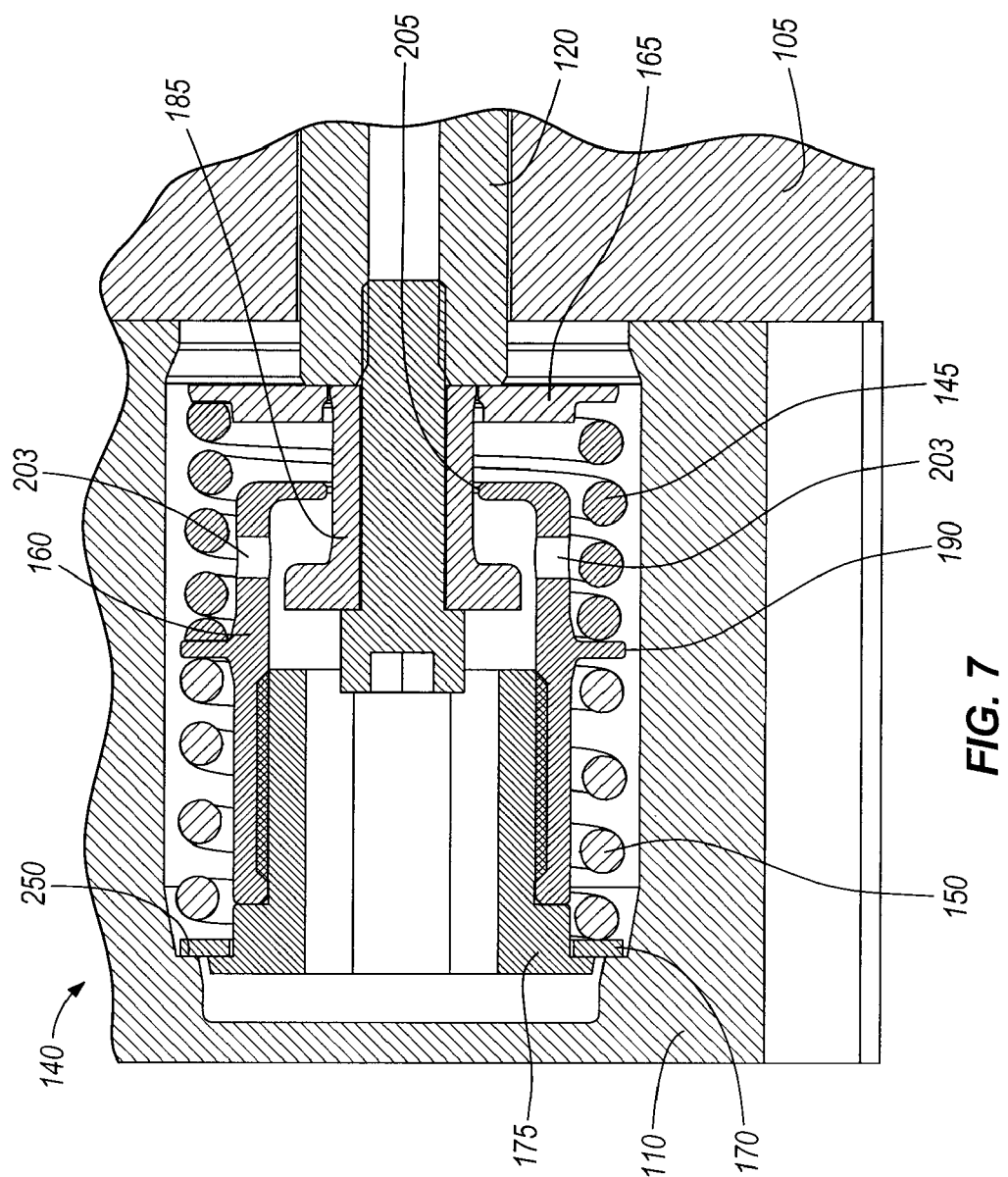
FIG. 7 is a cross-sectional view of the two-stage valve arrangement of FIG. 4 at an intermediate position of a lowering stroke.
Figure 8:
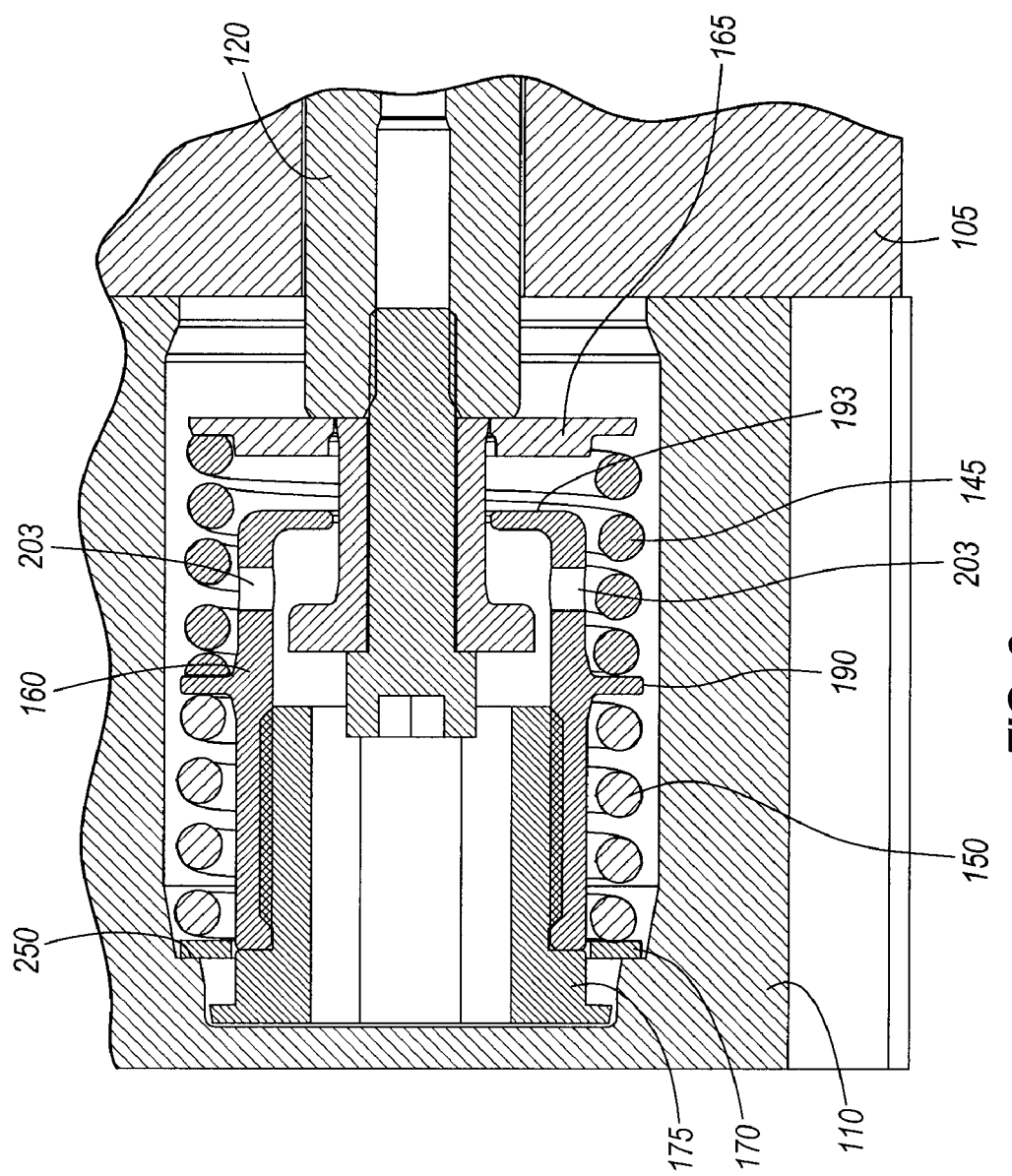
FIG. 8 is a cross-sectional view of the two-stage valve arrangement of FIG. 4 at the end of the lowering stroke.
Figure 9:
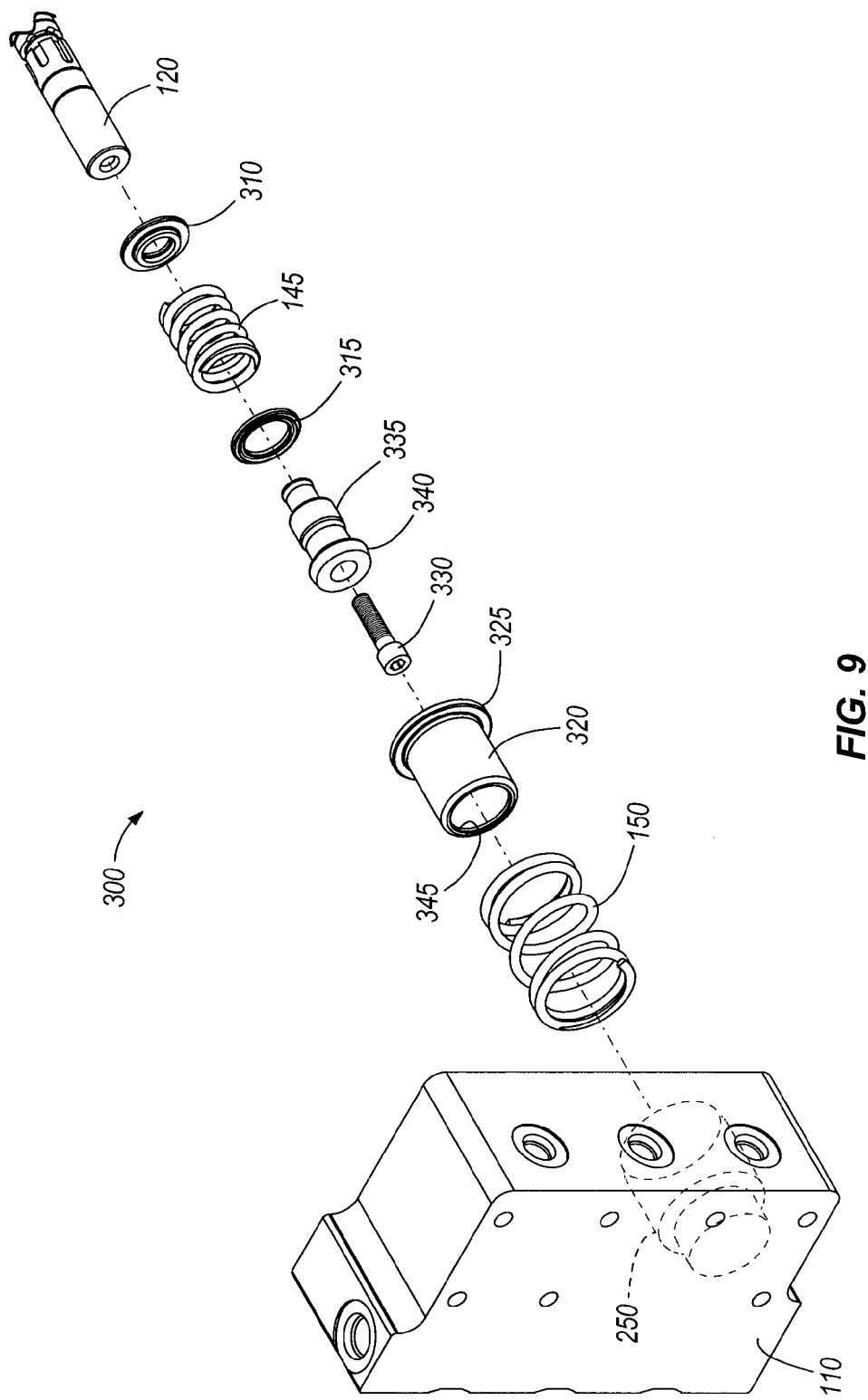
FIG. 9 is an exploded view of another embodiment of the two-stage valve assembly.

The lowering stroke of the lift spool 120 has two portions. The first portion of the lowering stroke is movement of the lift spool 120 from the center position (FIG. 3) to an intermediate position (FIG. 7). The second portion of the lowering stroke is movement of the lift spool 120 from the intermediate position to the end of the lowering stroke (FIG. 8).

With reference to FIG. 7 in the first portion of the lowering stroke, leftward movement of the threaded cap 175 and intermediate member 160 is opposed by the preload on the second spring 150 applying force against the shoulder 250 in the spring housing 110 (through the outer washer 170) and against the flange 190 of the intermediate member 160. In this regard, the intermediate member 160 acts as a force transferring member because it transfers biasing forces from the first spring 145 into the second spring 150. The intermediate member 160 is in the force path (i.e., transfers forces from the lift spool 120 to the first spring 145) in both the raising and lowering strokes.

Because the preload on the first spring 145 is lower than the preload on the second spring 150, only the first spring 145 deflects. The inner washer 165 moves away from the spool housing 105 of the MCV 100, and the spacer 185 slides within the hole 205 in the intermediate member 160. The spacer 185 therefore only transfers forces from the spool 120 to the first spring 145 during the raising stroke, and is out of the force path in the lowering stroke. As the inner washer 165 moves closer to the flange 190, the compressive load in the first spring 145 increases. The intermediate position illustrated in FIG. 7 is the point at which the load on the first spring 145 equals the pre-load on the second spring 150.

In the second portion of the lowering stroke (i.e., movement from the position illustrated in FIG. 7 to the position illustrated in FIG. 8), the first and second springs 145, 150 are both deflected. The combined or composite spring constant of the first and second springs 145, 150 is calculated with the following equation:

$$1/k_1 + 1/k_2 = 1/k_c$$

where $k_1$ is the first spring constant, $k_2$ is the second spring constant, and $k_c$ is the combined spring constant of the first and second springs 145, 150 acting in series. The combined spring constant is therefore lower than both of the first and second spring constants.

As both springs 145, 150 deflect, the intermediate member 160 and threaded cap 175 move left, but the outer washer 170 remains in abutment against the step 250 in the spring housing 110. Consequently, the space between the flange 190 and outer washer 170 decreases and a compressive load is applied to the second spring 150. The spring housing 110 may be constructed such that the threaded cap 175 bottoms out or is close to bottoming out against the spring housing 110 at the end of the lowering stroke, as illustrated in FIG. 8.

FIGS. 9-12 illustrate another embodiment 300 of the two-stage spring assembly, in which the first and second springs 145, 150 act in series but are nested instead of end-to-end. The spring assembly 300 of this embodiment includes inner and outer washers 310, 315, an intermediate member 320 having a flange 325, a fastener 330, and a spacer 335 having a lip 340. The fastener 330 extends through the spacer 335 and is threaded into the end of the lift spool 120 with one end of the spacer 335 abutting the end of the lift spool 120. The first spring 145 is captured between the inner washer 310, which abuts against the spool housing 105 and the outer washer 315, which abuts against the lip 340 of the spacer 335. The spacer 335 is sized such that a desired preload is applied to the first spring 145 when the fastener 330 is threaded tightly into the end of the lift spool 120.

The intermediate member 320 has a body that defines an inner space in which the first spring 145 is received, and the flange end 325 of the intermediate member 320 abuts against the spool housing 105. The opposite end of the intermediate member 320 includes a radially-protruding rim 345 against which the outer washer 315 abuts. The rim 345 surrounds the lip 340 of the spacer 335 such that the spacer can axially move through the hole defined by the rim 345. The hole in the outer washer 315, however, is too small for the lip 340 to fit through. The second spring 150 surrounds the outside of the intermediate member 320 and is trapped between the flange 325 and the step 250 in the spring housing 110.

Figure 10:
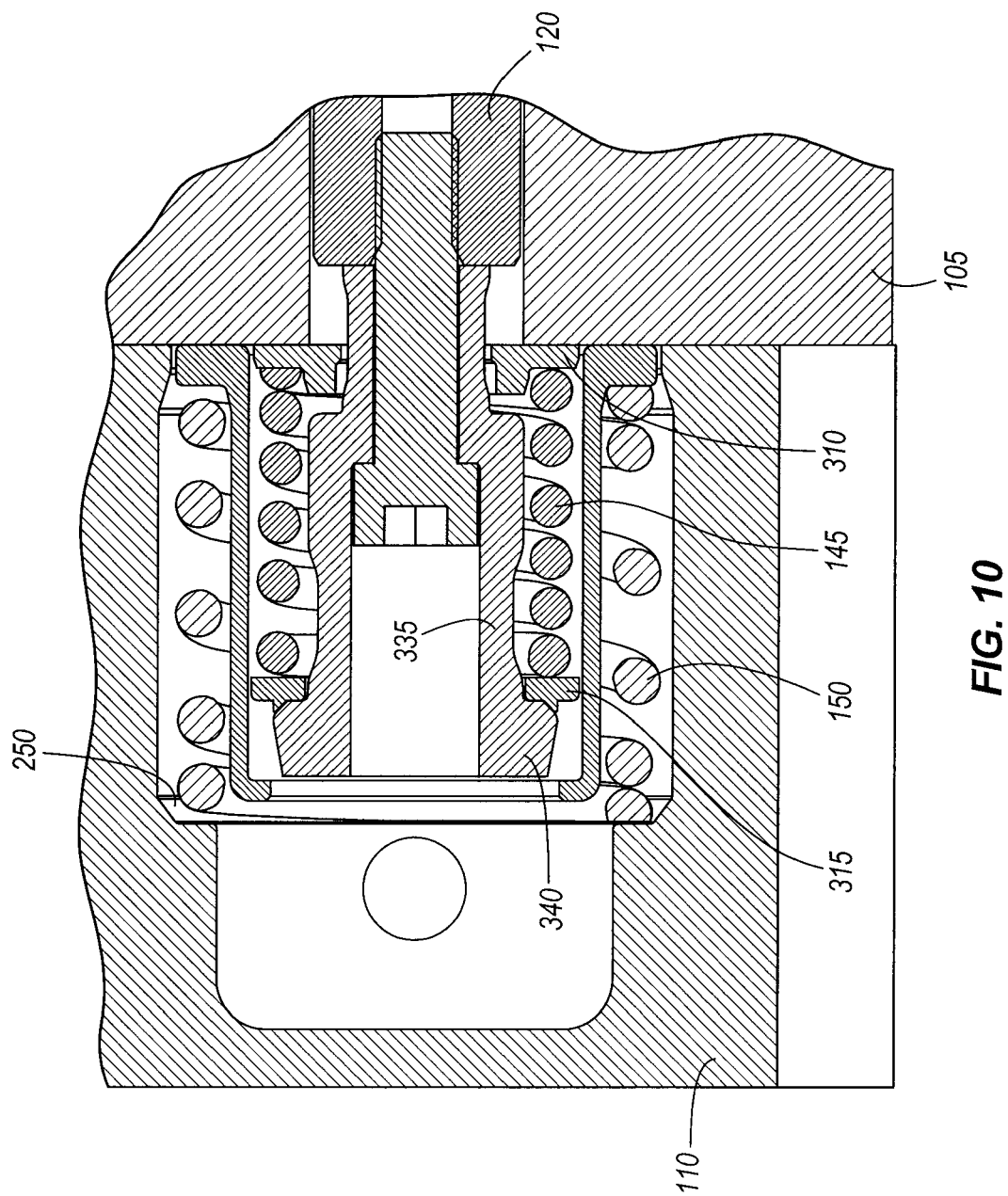
FIG. 10 is a cross-sectional view of the two-stage valve arrangement of FIG. 9 during a raising stroke.

With reference to FIG. 10, when the lift spool 120 is shifted right (i.e., the raising stroke), the lip 340 of the spacer 335 pulls the outer washer 315 to the right. Consequently, the distance between the outer and inner washers 315, 310 becomes smaller and the first spring 145 deflects. No compressive force is applied to the second spring 150 during the raising stroke, and the lift spool 120 is resisted only by the spring constant of the first spring 145 during the entire raising stroke. In this embodiment, the first spring 145 bears against the spool housing 105, and in this sense the spool housing 105 insulates the second spring 150 from the compressive forces of the first spring 145 during the raising stroke.

Figure 11:
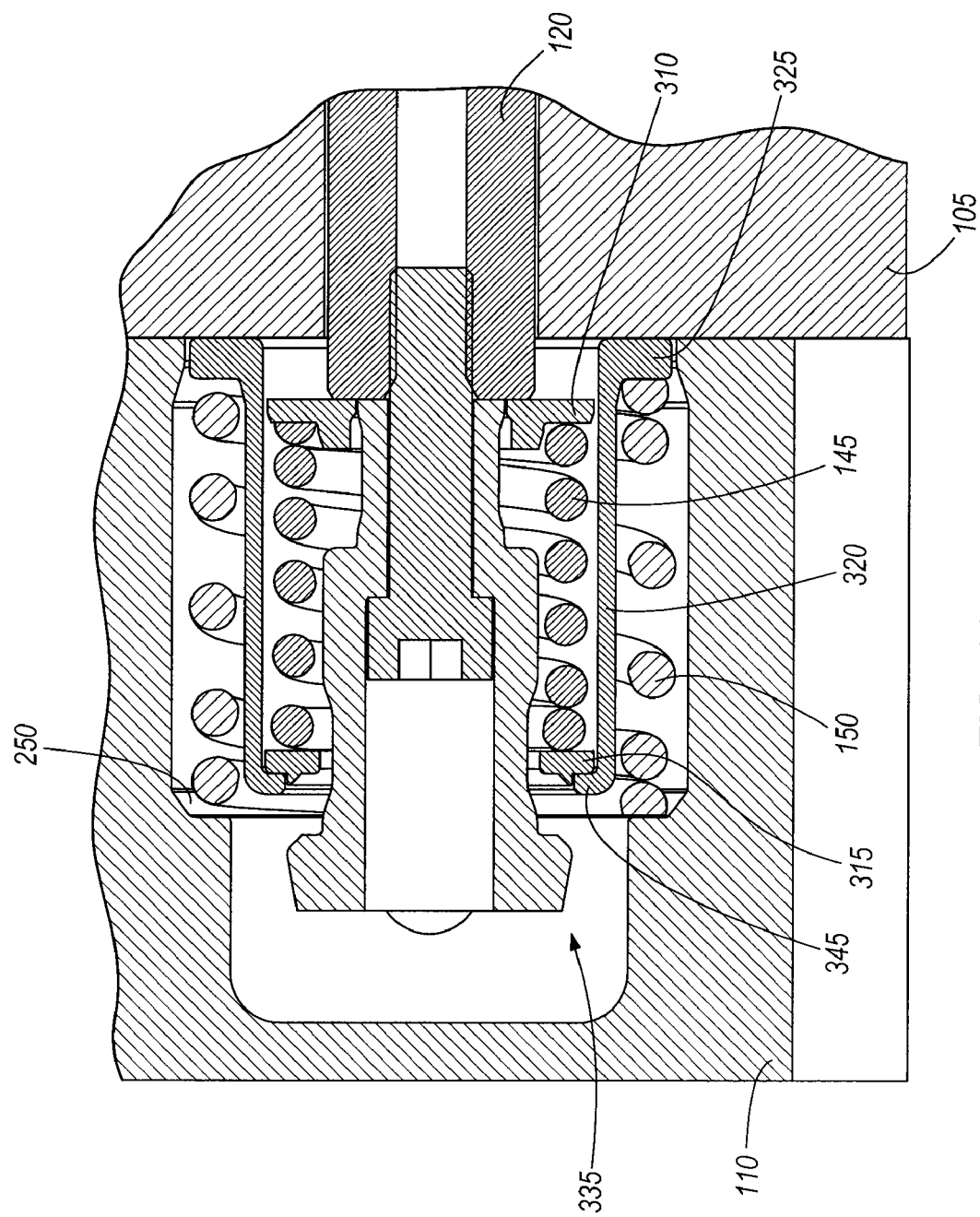
FIG. 11 is a cross-sectional view of the two-stage valve arrangement of FIG. 9 at an intermediate position of a lowering stroke.

With reference to FIG. 11 in the first portion of the lowering stroke, leftward movement of the intermediate member 320 is opposed by the preload on the second spring 150 applying force against the shoulder 250 in the spring housing 110 and the flange 325 of the intermediate member 320. In this regard, the intermediate member 320 acts as a force transferring member because it transfers biasing forces from the first spring 145 into the second spring 150 through the body of the intermediate member 320 and the flange 325. Because the preload on the first spring 145 is lower than the preload on the second spring 150, only the first spring 145 deflects. The inner washer 310 moves away from the spool housing 105, and the spacer 335 slides through the hole defined by the rim 345 in the intermediate member 320. The spacer 335 therefore only transfers forces from the spool 120 to the first spring 145 during the raising stroke, and is out of the force path in the lowering stroke. As the inner washer 310 moves closer to the outer washer 315, the compressive load in the first spring 145 increases. The intermediate position illustrated in FIG. 11 is the point at which the load on the first spring 145 equals the pre-load on the second spring 150.

In the second portion of the lowering stroke (i.e., movement from the position illustrated in FIG. 11 to the position illustrated in FIG. 12), the first and second springs 145, 150 are both deflected. The springs 145, 150 act in series, and the combined spring constant is calculated with the equation recited above. The combined spring constant is lower than both of the first and second spring constants.

Figure 12:
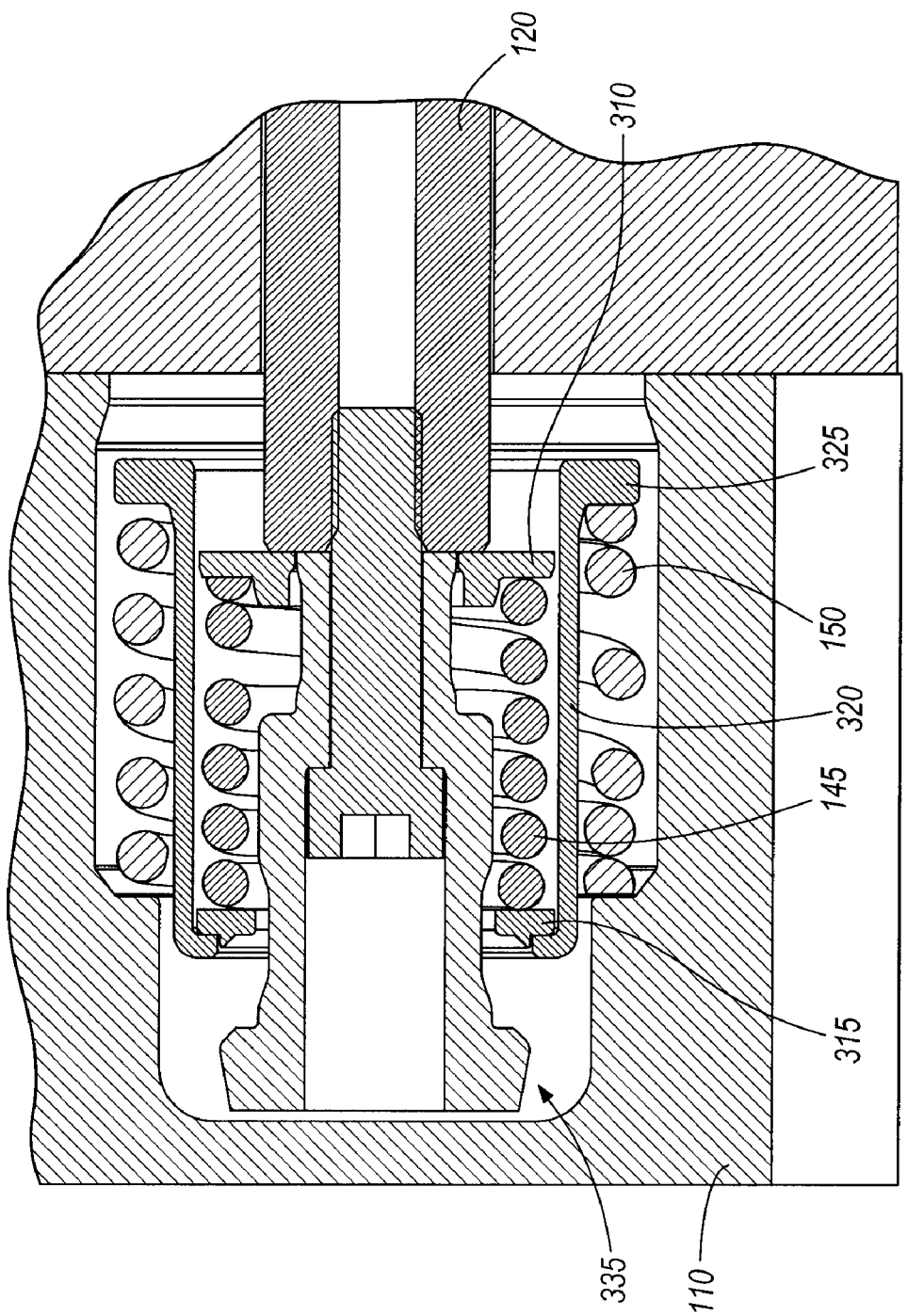
FIG. 12 is a cross-sectional view of the two-stage valve arrangement of FIG. 9 at the end of the lowering stroke.

As both springs 145, 150 deflect, both the spacer 335 and the intermediate member 320 move left. The space between the flange 325 and the step 250 in the spring housing 110 decreases and load is applied to the second spring 150. The spring housing 110 may be constructed such that the spacer 335 bottoms out or is close to bottoming out against the spring housing 110 at the end of the lowering stroke, as illustrated in FIG. 12.

In both illustrated embodiments, the lift spool 120 is said to be in "metering mode" when its movement is resisted by the first spring 145 alone (i.e., during the entire raising stroke and during the first portion of the lowering stroke). The higher spring constant of the first spring 145 requires the hydraulic actuators in the spring housing 110 and/or the actuator housing 115 to apply a relatively high level of force per unit deflection of the lift spool 120 in metering mode. The relatively high force-to-deflection ratio in metering mode permits the position of the lift spool 120 to be finely adjusted, which facilitates relatively fine adjustment of the lift arms 40. The intermediate position (FIGS. 7 and 11) is the end of the metering mode portion of the lowering stroke.

When the lift spool 120 has moved past the intermediate position (i.e., is between FIGS. 7 and 8 or between FIGS. 11 and 12), it is said to be in "float mode," in which the lift arms 40 and bucket 45 of the skid steer loader 10 are not actively lowered or raised by the hydraulic system, and are acted upon only by gravity. Resistance to lift spool 120 deflection drops from the first spring constant to the combined spring constant as the lift spool moves past the intermediate position. The lower spring constant created by the springs 145, 150 being deflected in series permits the hydraulic actuators in the spring housing 110 and/or the actuator housing 115 to apply a relatively low level of force per unit deflection of the lift spool 120 in float mode. The relatively low force-to-deflection ratio in float mode permits the lift spool 120 to be moved into and maintained within the float mode with minimal use of hydraulic pressure in the hydraulic circuit, and with minimal use of vehicle power. Available vehicle power and hydraulic pressure are therefore maximized for use in non-lifting operations while the lift spool 120 is in float mode.

Float mode is used by operators to back-drag, back-smooth or back-scrape terrain. The pitch of the bucket 45 determines the aggressiveness of the scraping or smoothing; the bucket 45 will glide more easily over (i.e., not scrape as aggressively) the terrain when the smooth undersurface of the bucket 45 is in contact with the terrain rather than the sharper edge of the bucket 45. To smooth over a relatively soft terrain (e.g., topsoil), the bucket 45 may be tilted such that the smooth bottom surface of the bucket 45 is facing down, then the lift spool 120 may be put into float mode, and then the skid steer loader 10 is moved in reverse over the terrain such that the back of the bucket 45 glides over the terrain to smooth it. To more aggressively scrape a relatively hard terrain (e.g., compacted earth, gravel) or to clear snow, ice, or another substance from a relatively hard surface such as concrete or asphalt, the bucket 45 may be tilted so that the relatively sharp edge of the bucket 45 contacts the terrain, then the lift spool 120 may be put into float mode and the skid steer loader 10 backed up over the terrain. In any event, the bucket 45 and lift arms 40 will ride up and down over the terrain and only scrape and smooth to the extent that the influence of gravity permits.

In one example of how the two-stage spring assemblies 140, 300 of the two illustrated embodiments may be set up, the first spring constant is 167 lbs/in, the second spring constant is 89 lbs/in, the preload on the first spring 145 is 10 lbs, and the preload on the second spring 150 is 60 lbs. In such setup, the resistance to lift spool 120 movement in metering mode is 167 lbs/in, and the resistance to lift spool 120 movement in float mode is about 58 lbs/in. While being preloaded, the first spring 145 is deflected about 0.06 inches to achieve the 10 lbs. preload. The distance between the center and intermediate positions in the lowering stroke (i.e., the deflection of the first spring to achieve a total load of 60 lbs) is about 0.30 inches.

Although the illustrated embodiment includes first and second compression springs 145, 150, these can be replaced with other biasing members, such as elastomeric materials, tension springs, or substantially any other members with shape memory that will apply biasing forces the lift spool 120. The term "spring constant" used above is intended to include the ratio of load to deflection, even if not linear, characterizing any suitable biasing members in addition to the first and second springs 145, 150.

Although the illustrated embodiment includes a single first spring 145 and a single second spring 150, these can be replaced with multiple springs acting in parallel or series to achieve the desired spring constants and preloads. Thus, the terms "first spring" and "second spring" should not be construed as limited to the single first and second springs 145, 150 in the illustrated embodiments.

Various features and advantages of the invention are set forth in the following claims.

What is claimed is:

1. A valve arrangement comprising:
a spool movable from a center position in a first direction through a first stroke and in a second direction through a second stroke;
a first biasing member having a first spring constant and a first preload;
a second biasing member having a second spring constant lower than the first spring constant and a second preload higher than the first preload;
a force transferring member operably interposed between the first and second biasing members to transfer biasing forces from the first biasing member to the second biasing member during the second stroke including a flange having first and second sides against which the respective first and second biasing members bear and first and second portions extending away from the respective first and second sides of the flange, wherein the first and second biasing members surround the respective first and second portions of the force transferring member; and
wherein the first biasing member and not the second biasing member biases the spool toward the center position through the entire first stroke;
wherein the first biasing member and not the second biasing member is deflected during movement of the spool from the center position to an intermediate position within the second stroke; and
wherein the first and second biasing members are deflected during movement of the spool from the intermediate position to an end of the second stroke, the biasing force of the first and second biasing members acting in series being less than the first spring constant and less than the second spring constant.

2. The valve arrangement of claim 1, further comprising means for insulating the second biasing member from biasing forces of the first biasing member during the first stroke, and means for transferring biasing forces from the first biasing member to the second biasing member during the second stroke.

3. The valve arrangement of claim 1, further comprising a fastener interconnected with the spool to apply a compressive force against the first biasing member; and a spacer between the fastener and the spool such that a desired preload on the first biasing member is achieved by tightly trapping the spacer between the fastener and spool.

4. The valve arrangement of claim 3, wherein the spacer moves with the spool during the first and second strokes; and wherein valve arrangement further comprises a force transferring member that transfers force from the spacer to the first biasing member during the first stroke but not during the second stroke.

5. The valve arrangement of claim 1, wherein the first and second biasing members are arranged end-to-end.

6. A work vehicle comprising:
a lift arm movable in raising and lowering directions;
a lift valve having a spool that is shiftable in a raising stroke to raise the arm, and in a lowering stroke to lower the arm;
a biasing mechanism providing relatively strong resistance to a first portion of the powering stroke of the lift valve and relatively weak resistance to a second portion of the lowering stroke of the lift valve, including first and second biasing members arranged in series and having respective first and second spring constants;
a fastener interconnected with the spool to apply a compressive force against the first biasing member;
a spacer positioned between the fastener and the spool such that a desired preload on the first biasing member is achieved by trapping the spacer between the fastener and spool, wherein the spacer moves with the spool during the raising and lowering strokes; and
a first force transferring member that transfers force from the spacer to the first biasing member during the raising stroke but not during the lowering stroke.

7. The work vehicle of claim 6, wherein the first spring constant is higher than the second spring constant; wherein the second biasing member has a preload force higher than the preload force on the first biasing member; wherein the first portion of the lowering stroke deflects the first biasing member but not the second biasing member; and wherein the second portion of the lowering stroke deflects the first and second biasing members.

8. The work vehicle of claim 6, further comprising means for insulating the second biasing member from biasing forces of the first biasing member during the raising stroke, and means for transferring biasing forces from the first biasing member to the second biasing member during the lowering stroke.

9. The work vehicle of claim 6, further comprising a second force transferring member operably interposed between the first and second biasing members to transfer biasing forces from the first biasing member to the second biasing member during the lowering stroke.

10. The work vehicle of claim 9, wherein the second force transferring member includes a flange having first and second sides against which the respective first and second biasing members bear.

11. The work vehicle of claim 10, wherein the second force transferring member includes first and second portions extending away from the respective first and second sides of the flange; and wherein the first and second biasing members surround the respective first and second portions of the force transferring member.

12. The work vehicle of claim 9, wherein the second force transferring member includes a body defining an inner space and having an outer flange; wherein one of the first and second biasing members is within the inner space, and wherein the other of the first and second biasing members surrounds the outside of the body and abuts against the flange.

13. The work vehicle of claim 12, wherein the first biasing member is within the inner space; wherein the first biasing member applies no biasing force against the second force transferring member during the raising stroke; and wherein the first biasing member applies a biasing force against an inner surface of the body during the lowering stroke such that the biasing force is transferred to the second biasing member through the flange.

14. The work vehicle of claim 6, wherein the first and second biasing members are arranged end-to-end.

15. The work vehicle of claim 6, wherein the first and second biasing members are nested.

16. The work vehicle of claim 6, wherein up and down movement of the lift arm is substantially only under the influence of gravity when the lift valve is in the second portion of the lowering stroke.

17. A compact construction vehicle comprising:
a control;
a lift arm movable in raising and lowering directions under the influence of a lift cylinder;
a bucket tiltable with respect to the lift arm in curling and dumping directions under the influence of a tilt cylinder;
a source of pressurized hydraulic fluid;
a tilt spool movable in response to actuation of the control to selectively provide pressurized hydraulic fluid from the source to the tilt cylinder to actuate the tilt cylinder;
a tilt biasing mechanism for biasing the tilt spool into a center position in which the tilt cylinder maintains the bucket in a fixed position;
a lift spool movable in response to actuation of the control in a raising stroke to actuate the lift cylinder to raise the lift arm, movable in a first portion of a lowering stroke to actuate the lift cylinder to lower the lift arm, and movable in a second portion of the lowering stroke to permit the lift cylinder and lift arm to operate substantially entirely under the influence of gravity and not under the influence of the pressurized hydraulic fluid;
a lift centering mechanism for biasing the lift spool into a center position in which the lift cylinder maintains the lift arm in a fixed position, the lift centering mechanism including a first spring having a first spring constant and first preload, and a second spring having a second spring constant lower than the first spring constant and second preload higher than the first preload;
wherein the first and second springs act in series such that the first spring applies force against the second spring during the lowering stroke; wherein first portion of the lowering stroke ends and the second portion of the lowering stroke begins when the first spring has been deflected sufficiently that the biasing force in the first spring equals the preload in the second spring; and
wherein the first and second springs act in series in the second portion of the lowering stroke to bias the lift spool toward the center position with a combined spring constant that is lower than the first spring constant and lower than the second spring constant, such that control is more easily actuated in the second portion of the lowering stroke than in the first portion of the lowering stroke.

18. The compact construction vehicle of claim 17, further comprising an intermediate member operably interposed between the first and second springs and transferring forces from the first spring to the second spring only during the lowering stroke.

19. The compact construction vehicle of claim 17, further comprising a force transfer member transferring force from the lift spool to the first spring during the raising stroke but not during the lowering stroke.

20. The compact construction vehicle of claim 17, further comprising an intermediate member having a flange against which the second spring bears, the intermediate member transferring forces from the first spring to the second spring through the flange only during the lowering stroke.

21. The compact construction vehicle of claim 20, further comprising a cap mounted to the intermediate member to trap the second spring between the cap and the flange such that the second preload is applied to the second spring when the cap is tightly secured against the intermediate member.

22. The compact construction vehicle of claim 20, wherein the intermediate member defines an inner space; wherein the second spring surrounds a portion of the intermediate member; and wherein the first spring is within the inner space.

23. The compact construction vehicle of claim 17, further comprising a spacer secured to the lift spool and bearing on the first spring, wherein the spacer is sized such that the first preload is applied to the first spring when the spacer is tightly secured against the spool, the spacer transferring force to the first spring beyond the preload only during the raising stroke.

* * * * *

UNITED STATES PATENT AND TRADEMARK OFFICE
CERTIFICATE OF CORRECTION

PATENT NO. : 7,631,591 B2  Page 1 of 1
APPLICATION NO. : 11/561961
DATED : December 15, 2009
INVENTOR(S) : Shelbourn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 257 days.

Signed and Sealed this

Second Day of November, 2010

David J. Kappos
*Director of the United States Patent and Trademark Office*